United States Patent [19]

Gutshall

[11] 4,202,244
[45] May 13, 1980

[54] RECESSED HEAD SCREW

[75] Inventor: Charles E. Gutshall, Rockford, Ill.

[73] Assignee: Technofast, Inc., Willowbrook, Ill.

[21] Appl. No.: 928,108

[22] Filed: Jul. 26, 1978

[51] Int. Cl.$^2$ ............................................. F16B 23/00
[52] U.S. Cl. .................................................... 85/45
[58] Field of Search ............... 85/45; 145/50 A, 50 R; 10/10 R, 7, 20

[56] References Cited

U.S. PATENT DOCUMENTS

| | | | |
|---|---|---|---|
| 2,397,216 | 3/1946 | Stellin | 85/45 |
| 2,474,994 | 7/1949 | Tomalis | 85/45 |
| 2,556,155 | 6/1951 | Stellin | 85/45 |
| 3,295,572 | 1/1967 | Wing | 85/45 X |
| 4,084,478 | 4/1978 | Simmons | 85/45 |

FOREIGN PATENT DOCUMENTS 2356046  1/1978  France ............................... 85/45

Primary Examiner—Ramon S. Britts
Attorney, Agent, or Firm—Merriam, Marshall & Bicknell

[57] ABSTRACT

A screw head recess includes a generally frusto-conical central socket and radial slots interconnected by concave sections of the socket. Each slot is defined by two opposed wall surfaces which intersect with a bottom surface which slopes radially inwardly and downwardly along the axis of the screw. At least a portion of the junction between one sidewall and the bottom surface is curved to produce a camming surface for frictional engagement between the screw and a driving tool sufficient to provide a temporary stick-fit between the screw and the tool.

4 Claims, 12 Drawing Figures

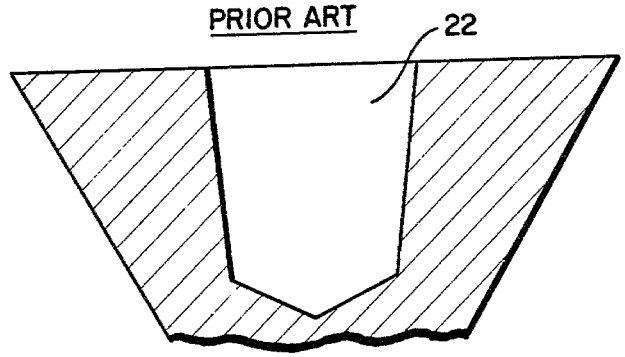
FIG. 5
PRIOR ART
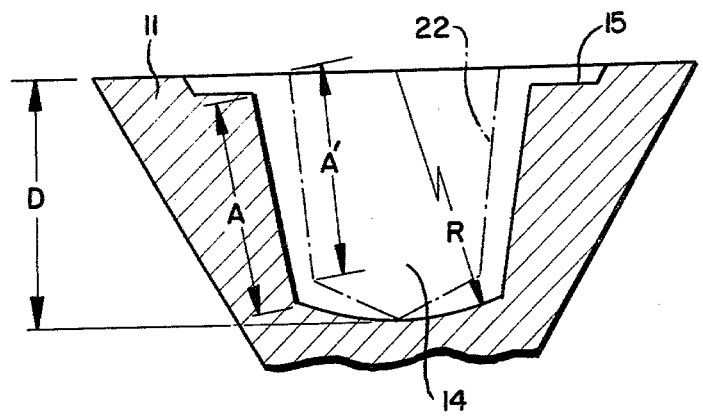
FIG. 6
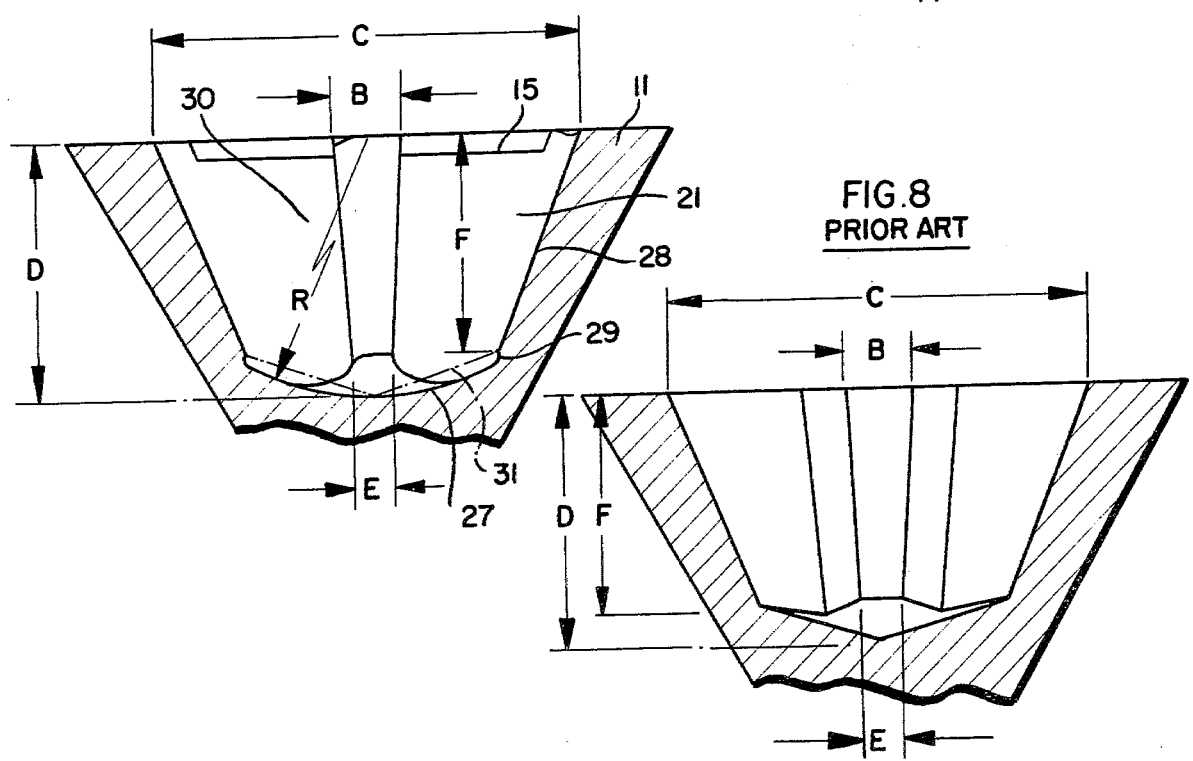
FIG. 7
FIG. 8
PRIOR ART

RECESSED HEAD SCREW

This invention relates to screw thread fasteners and the like, of the type having a cruciform recess in the head thereof. More particularly, the invention relates to an improved recess for use in the heads of such screws.

BACKGROUND OF THE INVENTION

Screws and similar fasteners in which the head is provided with a cruciform recess for engaging a driving tool, generally referred to as "Phillips head" or "Phillips-type" screws, are well-known and have been widely used in many commercial applications. In screws of this type, as exemplified in U.S. Pat. Nos. 2,046,839, 2,084,079, 3,025,896, 3,108,623 and 3,237,506, the recess typically comprises a central cavity and a plurality of radially extending slots which communicate with the central cavity. The corresponding driving tool comprises a like number of flutes which engage the slots in the head in a manner which prevents slipping of the driving tool out of engagement with the screw, as can easily happen with a conventional screw having a single slot intended to be driven by a flat-bladed screw driver.

Screws of the Phillips type are conventionally produced by punching the preformed enlarged head of a suitable blank with a punching tool having the contours of the desired recess. Since the recess which is produced must mate closely with a standard driving tool, the allowable variation in the size and shape of the recess which is punched in the head of the screw must be controlled within relatively narrow limits. The effective life of a typical header punch used to produce the recess is relatively short, since the punch wears rapidly and in so doing ultimately produces a recess which is too small to receive a standard tool. In addition, because of the high localized forces on the header punch, it is subject to a high rate of breakage. The relatively short life and high incidence of breakage of the header punches heretofore used for producing Phillips-type screws obviously represent an undesirable additional expense in the manufacture of such screws.

In many commercial applications using Phillips-type screws, it is desirable that the screw frictionally engage the driving tool sufficiently to maintain its position on the tool regardless of its orientation, thereby facilitating the installation of such screws in locations which may be difficult to reach. In order to achieve this result, the original design of the Phillips recess has been modified, as exemplified in U.S. Pat. Nos. 2,402,342, 2,474,994, and 2,588,404, in order to provide frictional engagement between the screw head and the driving tool.

BRIEF DESCRIPTION OF THE DISCLOSURE

In accordance with the present invention, there is provided a screw of the Phillips type which has an improved recess of a form which, when produced in conventional fashion by the use of an appropriate header punch, increases the effective life of the punch. In addition, the improved recess of the invention is of a form which provides sufficient frictional engagement between the screw and the driving tool to permit using the driving tool as a means for placing the screw in a desired location. The improved recess of the invention further permits the screw to be more readily plated or electrocoated with a desired plating material and also results in fewer cracks in the periphery of the recess.

Briefly described, the screw of the invention has a recess comprising a central socket portion having a wall which lies on a frusto-conical surface. Radially extending from the central socket portion are a plurality of slots adapted to receive the flutes of a suitable driving tool. Because of the frusto-conical surface of the socket portion, the wall of the recess between adjacent slots is concave, rather than convex as in the conventional Phillips recess. Each slot is defined by two opposing all surfaces which intersect with a bottom surface which slopes radially inwardly and downwardly along the axis of the screw. For at least a portion of the length of the bottom slot surface, the juncture between at least one sidewall and the bottom surface is not sharp, but rather suitably curved, whereby on insertion of the driving tool, the flute thereof is cammed against the curved surface and the opposite sidewall, producing enough frictional engagement to maintain the screw in position on the tool regardless of the orientation of the tool.

The bottom of the central socket portion of the recess is provided with a concave spherical surface, and in a preferred embodiment of the invention the spherical surface is separated from the frusto-conical sidewall of the socket by a cylindrical surface. The contour of the bottom of the recess, which matches that of the header punch used to produce it, produces in the header punch a sacrifical wear surface which greatly extends the life thereof.

DESCRIPTION OF THE DRAWINGS

The invention will be better understood from the detailed description thereof set out below, taken in conjunction with the accompanying drawings, in which the same numerals are used to designate like elements in the different views, and in which:

FIG. 5 is a cross-sectional view along the line 5—5 of FIG. 2 (prior art);

FIG. 6 is a cross-sectional view along the line 6—6 of FIG. 4;

FIG. 7 is a cross-sectional view along the line 7—7 of FIG. 4;

FIG. 8 is a cross-sectional view along the line 8—8 of FIG. 2 (prior art);

DETAILED DESCRIPTION

Figure 1:
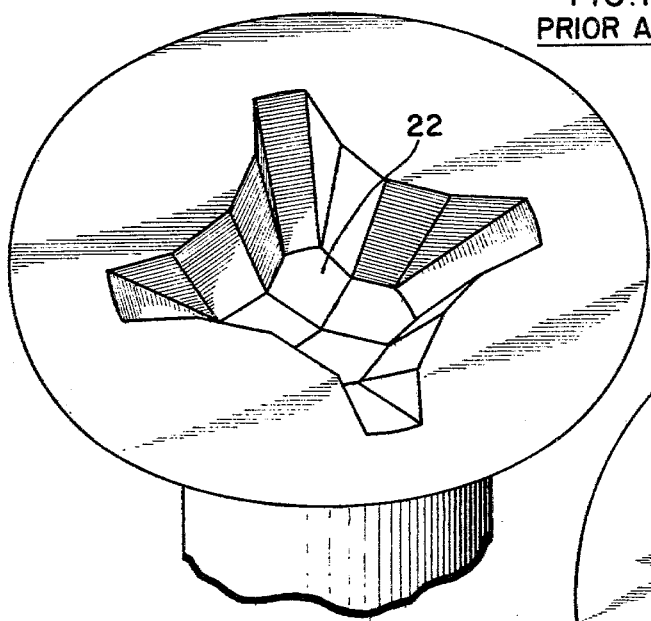
FIG. 1 is a perspective view of a screw head provided with a conventional Phillips recess in accordance with the prior art.
Figure 2:
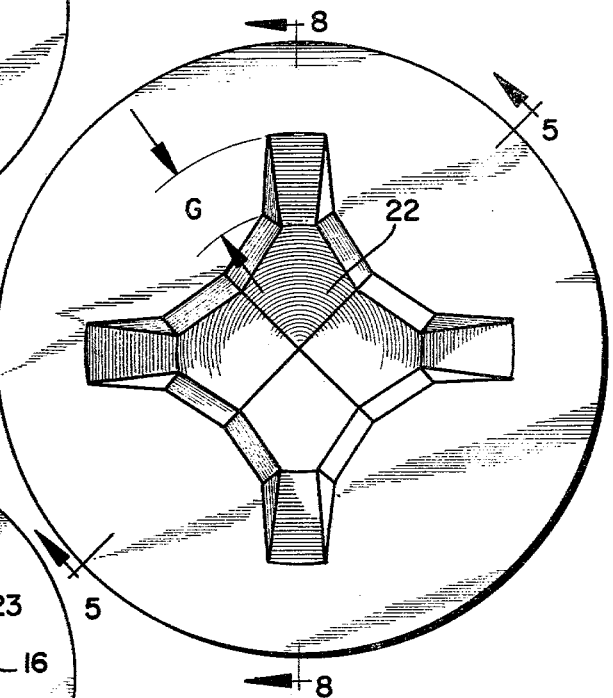
FIG. 2 is a top plan view of the screw head shown in FIG. 1 (prior art)

Preferred embodiments of the invention are illustrated in FIGS. 3, 4, 6, 7, 10 and 11. Also shown in the drawings for comparison with the invention, is a typical embodiment of a Phillips head screw produced in accordance with the prior art (FIGS. 1, 2, 5 and 8).

Figure 3:
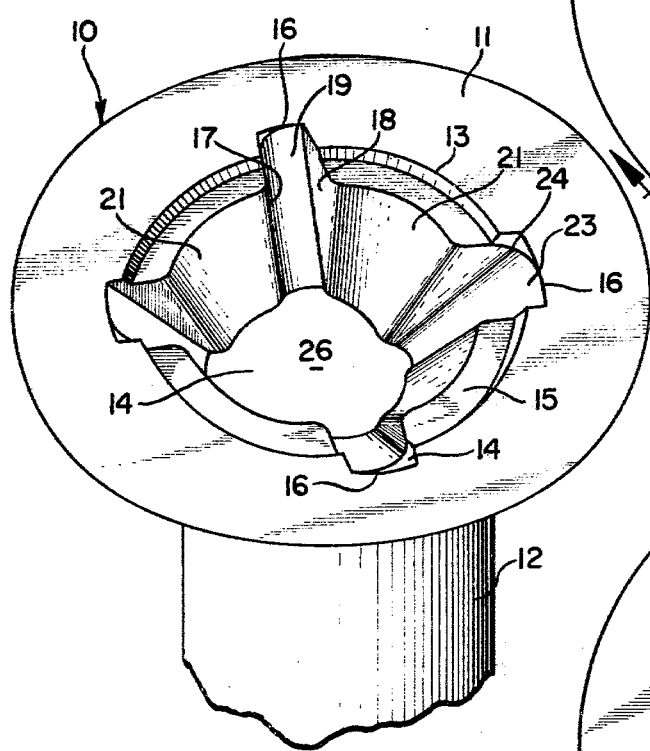
FIG. 3 is a perspective view of a screw head showing one embodiment of the recess of the invention.
Figure 4:
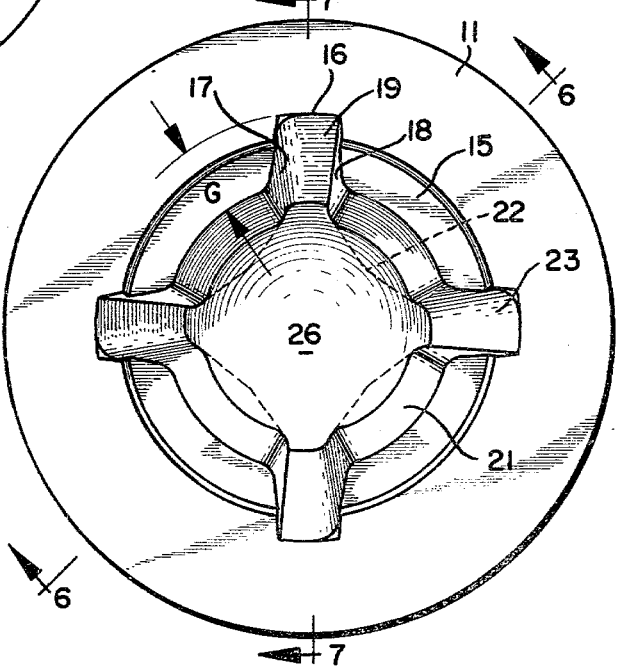
FIG. 4 is a top plan view of the screw head of FIG. 3.

As shown in FIGS. 3 and 4, in a typical embodiment of the invention, a screw 10 is provided with a flat head 11 and a shank 12. Head 11 is provided with a recess 13 comprising a central socket portion 14 which communicates with radially extending slots 16. A shallow annular groove or indent 15 encircles the periphery of socket portion 14. Indent 14 conceals the flash normally created during production of the screw, and in addition serves to restrain defacing movement of a driver tool bit in the event it should cam out of the central recess.

Each slot 16 comprises two opposed sidewalls 17 and 18, which are interconnected by a bottom wall 19 which slopes downwardly and inwardly along the axis 20 of the screw. The sidewalls 21 of the central socket portion 14, which interconnect the sidewalls of two adjacent slots, lie on a frusto-conical surface. Shown in dashed lines in FIG. 4 is the outline of the central socket portion 22 of the conventional Phillips recess shown in FIGS. 1 and 2. A view in cross-section of socket portion 14 is shown in FIG. 6, and superimposed thereon in dashed lines is the outline of socket portion 22 of FIG. 1.

It will be seen from the drawings that the central socket portion 14 of the present invention is substantially larger than that (22) of the prior art. Accordingly, the socket-forming portion of the punch used to form recess 13 is substantially thicker and accordingly stronger and less subject to breakage in use. In addition, the substantially more open socket portion 14 of the present invention facilitates coating or electro-deposition of a desired material, such as chrome plating, within the entire depth of the recess.

In the embodiment shown in FIGS. 3 and 4, bottom wall 19 and sidewall 18 of each slot 16 intersect at substantially right angles and form a line of juncture which is relatively sharp. On the opposite side of each slot, however, the corresponding intersection between bottom wall 19 and sidewall 17 is not a sharp angle, but rather a concave camming surface 23, which extends for at least a portion of the length of the bottom wall from the top to the bottom of the slot. The camming surface 23 is produced in each slot by an appropriate configuration on the header punch used to produce the recess. The radius of curvature of camming surface 23 can be constant throughout its length, or alternatively it can vary. Primarily for purposes of appearance, it may be desirable to form a sloping shoulder 24 at the point of intersection of the camming surface 23 with the top surface of the screw head, so as to maintain a symmetrical cruciform appearance for the recess.

As shown in FIG. 6, the bottom surface 26 of the central socket portion 14 of the recess is spherical (radius R) rather than sharply pointed as in the prior art embodiment of FIG. 5. The maximum depth (D) of socket 14 along the axis of the screw head, however, is identical to that of the prior art screw, as shown in FIG. 6, so that the driving tool used with the screw will enter the recess of the invention to the same extent. The header punch used to form the recess shown in FIG. 6, i.e., one having a spherical bottom surface rather than a tapered angular surface such as that shown in FIG. 5, causes the displaced metal to flow in a more axial (rather than radial) direction, thus reducing the incidence of peripheral cracks in the head, and at the same time the increased space available between the bottom surface 26 of socket portion 14 and the tip of a conventional Phillips driver provides an accumulation zone for dirt or other extraneous materials which might otherwise interfere with the insertion of the driving tool.

As will be evident from the drawings, there are many points of similarity between the recess of the present invention and that of the prior art, particularly in certain dimensions, which permit the screw of the present invention to be driven by a standard Phillips driving tool. In particular, as shown in FIGS. 2, 4, 6 and 7, the following dimensions are substantially identical in the screw of the present invention and in a conventional Phillips head screw: the width of each slot at the top (B) and at the bottom (E) of the recess; the diametrical distance (C) between the outer ends of opposite slots at the top of the screw head; the maximum axial depth (D) of the recess; the axial depth (F) of the bottom wall of each slot; and the radial length (G) of each slot which is available for mating with the driving tool.

Because of the presence of indent 15 in the present invention, the effective height (A) (FIG. 6) of the slot is not identical with that of the corresponding dimension (A') in the prior art. Since, however, the outer edge of the bottom surface 26 of the socket portion 14 of the recess is at a lower point in the present invention, the dimension A is at least as large as that of A', whereby the present invention suffers no disadvantage.

In FIG. 7, there is shown a preferred variation of the recess of FIG. 6. In FIG. 7, in addition to being spherical in contour (radius R), the bottom surface 27 of central socket portion 28 is joined to sidewall 28 by a narrow cylindrical surface 29 which is radiused at its corners. In the header punch used to form a socket of this configuration, the effective increase in mass represented by the material between the bottom surface 27 of socket portion 30 and the dotted line 31 in FIG. 7, representing the bottom of a conventional Phillips socket, represents a sacrificial wear feature, which permits the header to wear in use so as to extend its useful service life.

Figure 9:
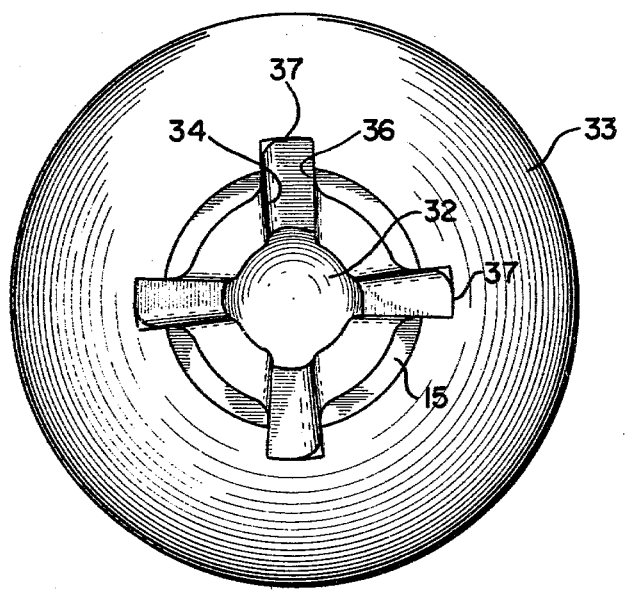
FIG. 9 is a top plan view of the head of a round-head screw incorporating an embodiment of the invention, in which the width of the bottom wall of each slot tapers.

In FIG. 9, there is depicted a cruciform recessed socket 32 in accordance with the invention as applied to a round-head screw 33. In this embodiment, the sidewalls 34 and 36 of each slot 37 taper towards each other axially in a direction towards the point of the screw. The tapering of the slots follows the tapering typically used in Phillips driving tools.

Figure 10:
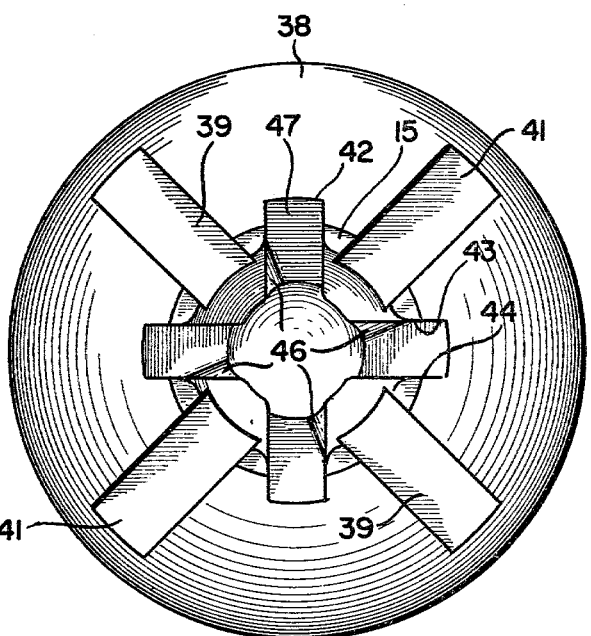
FIG. 10 is a top plan view of the head of a round-head screw illustrating another embodiment of the invention, in which each slot is uniform in width and in which the head has been provided with auxiliary straight slots for driving the screw by means of a flat-bladed screwdriver.

In FIG. 10, there is depicted an improved version of the recess shown in FIG. 9, which is also provided with auxiliary means permitting the screw to be driven by a conventional flat-bladed screwdriver. In FIG. 10, head 38 is provided with two slots or kerfs 39 and 41 arranged at right angles and disposed between slots 42 in the screw recess 43. This arrangement avoids interference between kerfs 39 and slots 42 and also minimizes the unsupported distance between the inner ends of each kerf, thereby maximizing the extent to which a flat-bladed screwdriver will be supported by the screwhead and inhibited against falling into the central socket of the screw. In FIG. 10, the opposite sidewalls 43 and 44 of each slot 42 are parallel rather than tapering as in FIG. 9. At a point below the top surface of each slot 42 and continuing to the bottom thereof, a concave camming surface 46 is provided along the line of juncture between bottom wall 47 and sidewall 43. In this case, the radius of curvature of camming surface 46 is not constant but increases towards the bottom of the slot, thus making allowance for some variation in the size of the driving flute which can be used, while maintaining a frictional engagement with the screw head.

Figure 11:
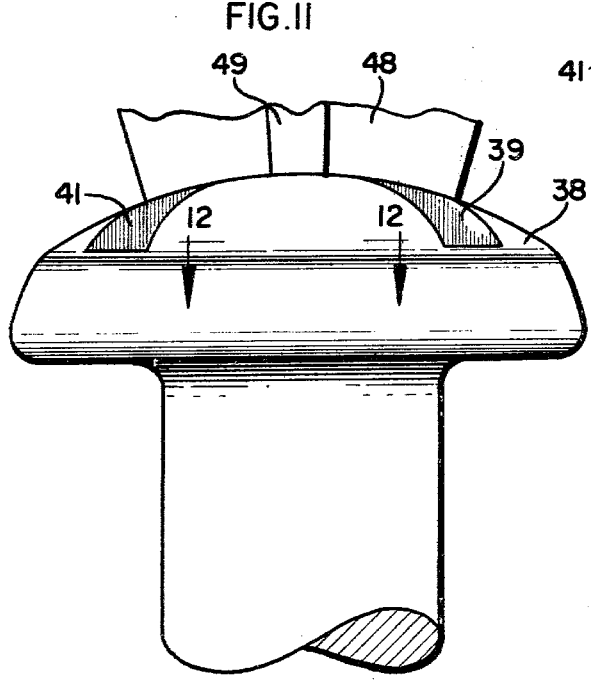
FIG. 11 is a side view of the embodiment of FIG. 10 showing the tip of a driving tool of the Phillips type inserted in the recess in the head of the screw.
Figure 12:
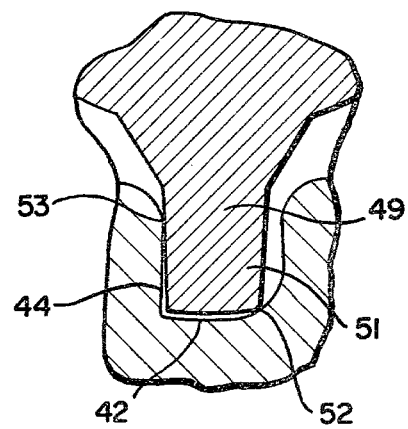
FIG. 12 is an enlarged partial section along the line 12—12 of FIG. 11 showing the engagement between a flute of the driving tool and a slot in the recess of the head.

The operation of the camming surface, e.g. 23, 46, used in the recess of the invention in producing a frictional engagement between the driver and the screw is illustrated in FIGS. 11 and 12. In FIG. 11, a portion the tip 48 of a conventional Phillips driving tool is shown inserted in the recess of head 38. The flute 49 of the tip 48 will penetrate into slot 42 until the corner 51 of the flute bears against the curved camming surface 46 at point 52. The force applied to the flute accordingly causes it to engage the opposite sidewall 44 at point 53, thus producing a clinging fit between the screw and the driving tool 48.

The foregoing detailed description has been given for clearness of understanding only, and no unnecessary limitations should be understood therefrom as modifications will be obvious to those skilled in the art.

What is claimed is:

1. In a screw having a head provided with a cruciform recess comprising a plurality of radially extending slots, said recess being adapted to received a driving tool provided with flutes which engage said slots, the improvement wherein:

said recess comprises a generally frusto-conical central socket portion having sidewall concave sections interconnecting adjacent slots and a generally spherical bottom surface;

each of said slots comprises a pair of opposed sidewalls and a generally sloping bottom wall interconnecting said sidewalls, said opposed sidewalls being symmetrically inclined relative to the axis of said screw, said bottom wall of each of said seat joining a single one of said sidewalls in a concave camming surface extending along at least a portion of the depth of said slot;

whereby on insertion of said driving tool, a flute of said tool which enters a slot in said head is cammed between said concave surface and the opposite sidewall of said slot, creating a frictional engagement between said tool and said screw.

2. A screw in accordance with claim wherein said head is provided with an annular indent adjacent the periphery of said central socket portion of said recess.

3. A screw in accordance with claim 1 wherein said sidewalls of each slot are generally parallel to the axis of said screw.

4. A screw in accordance with claim 1, in which a cylindrical surface interconnects said spherical bottom surface and said conical sidewall of said central socket portion.

* * * * *